United States Patent
Jangid et al.

(10) Patent No.: US 11,924,748 B2
(45) Date of Patent: Mar. 5, 2024

(54) METHOD AND APPARATUS FOR HANDLING CELL SELECTION AND RE-SELECTION IN MR-DC SYSTEM

(71) Applicant: Samsung Electronics Co., Ltd., Gyeonggi-do (KR)

(72) Inventors: Alok Kumar Jangid, Bangalore (IN); Kailash Kumar Jha, Bangalore (IN); Mudit Goel, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/828,218

(22) Filed: May 31, 2022

(65) Prior Publication Data

US 2022/0295387 A1    Sep. 15, 2022

Related U.S. Application Data

(63) Continuation of application No. 16/556,722, filed on Aug. 30, 2019, now Pat. No. 11,363,523.

(30) Foreign Application Priority Data

Aug. 30, 2018  (IN) .................. 201841032570 PS
Aug. 14, 2019  (IN) .................. 201841032570 CS

(51) Int. Cl.
*H04W 48/20*  (2009.01)
*H04W 48/16*  (2009.01)
*H04W 88/06*  (2009.01)

(52) U.S. Cl.
CPC ........... *H04W 48/16* (2013.01); *H04W 48/20* (2013.01); *H04W 88/06* (2013.01)

(58) Field of Classification Search
CPC ...... H04W 48/16; H04W 48/20; H04W 88/06
See application file for complete search history.

(56) References Cited

U.S. PATENT DOCUMENTS

| | | |
|---|---|---|
| 2014/0357268 A1 | 12/2014 | Dubey et al. |
| 2015/0173004 A1 | 6/2015 | Nigam et al. |
| 2016/0057668 A1 | 2/2016 | Lee et al. |
| 2017/0064691 A1 | 3/2017 | Kubota |
| 2017/0135005 A1 | 5/2017 | Basu Mallick et al. |
| 2017/0150384 A1 | 5/2017 | Rune et al. |

(Continued)

FOREIGN PATENT DOCUMENTS

| | | |
|---|---|---|
| CN | 105144795 | 12/2015 |
| CN | 108307686 | 7/2018 |

(Continued)

OTHER PUBLICATIONS

Antonioli et al., "Dual Connectivity for LTE-NR Cellular Networks", Wireless Telecommunications Research Group (GTEL), Sep. 6, 2017, 5 pages.

(Continued)

*Primary Examiner* — Chuong A Ngo
(74) *Attorney, Agent, or Firm* — The Farrell Law Firm, P.C.

(57) ABSTRACT

Disclosed is a method for handling cell selection in a multiple radio access technology dual connectivity (MR-DC) system, including scanning, by a user equipment (UE), at least one frequency, identifying, by the UE, a first cell supporting an MR-DC based on the scanned at least one frequency, and camping, by the UE, to the identified first cell.

21 Claims, 11 Drawing Sheets

(56) References Cited

U.S. PATENT DOCUMENTS

| | | | |
|---|---|---|---|
| 2017/0331670 | A1 | 11/2017 | Parkvall et al. |
| 2018/0227699 | A1 | 8/2018 | Kim et al. |
| 2019/0069205 | A1* | 2/2019 | Lee .................. H04W 36/00835 |
| 2019/0223091 | A1 | 7/2019 | Huang-Fu et al. |
| 2019/0379469 | A1* | 12/2019 | Lu ........................... H04L 43/16 |
| 2021/0022146 | A1 | 1/2021 | Hong |

FOREIGN PATENT DOCUMENTS

| | | |
|---|---|---|
| CN | 108401537 | 8/2018 |
| KR | 10-2018-0045727 | 5/2018 |
| WO | WO 2015/047051 | 4/2015 |
| WO | WO 2015/108382 | 7/2015 |
| WO | WO 2017/034230 | 3/2017 |
| WO | WO 2018/124276 | 7/2018 |
| WO | WO 2018/142303 | 8/2018 |
| WO | WO 2019/046028 | 3/2019 |

OTHER PUBLICATIONS

Ericsson et al., GTI, 5G Network Architecture White Paper V1.0, Internet, http://www.gtigroup.org, Feb. 12, 2018, 26 pages.
International Search Report dated Dec. 12, 2019 issued in counterpart application No. PCT/KR2019/011062, 7 pages.
Indian Examination Report dated Dec. 17, 2020 issued in counterpart application No. 201841032570, 6 pages.
3GPP, 3rd Generation Partnership Project; Technical Specification Group Radio Access Network; Evolved Universal Terrestrial Radio Access (E-UTRA) and NR; Multi-connectivity; Stage 2 (Release 15), 3GPP TS 37.340 V15.2.0, Jun. 2018, 55 pages.
European Search Report dated Apr. 26, 2021 issued in counterpart application No. 19855048.5-1212, 9 pages.
European Search Report dated Feb. 17, 2023 issued in counterpart application No. 19855048.5-1216, 57 pages.
U.S. Appl. No. 62/617,151 dated Jan. 12, 2018.
Vivo, "Impacts of Dual Camping UE", R2-1710927, 3GPP TSG-RAN WG2 Meeting #99bis, Oct. 9-13, 2017, 6 pages.
Vodafone, "Handling of Very Large UE Radio Capabilities for the Anticipated EN-DC UEs", S2-184406, SA WG2 Meeting #127, Apr. 16-20, 2018, 4 pages.
Gao Zhan et al. "Study on Cell Selection Between TD-SCDMA and GSM", Communications Technology, vol. 41, No. 9, Sep. 10, 2008, 3 pages.
Chinese Office Action dated Dec. 9, 2023 issued in counterpart application No. 201980042762.9, 13 pages.

* cited by examiner

METHOD AND APPARATUS FOR HANDLING CELL SELECTION AND RE-SELECTION IN MR-DC SYSTEM

CROSS-REFERENCE TO RELATED APPLICATION(S)

This application is a Continuation of U.S. patent application Ser. No. 16/556,722, filed with the U.S. Patent and Trademark Office on Aug. 30, 2019, which is based on and claiming priority under 35 U.S.C. § 119(a) to Indian Provisional Patent Application Serial No. 201841032570 (PS), filed on Aug. 30, 2018, in the Indian Intellectual Property Office, and to Indian Complete Patent Application Serial No. 201841032570 (CS), filed on Aug. 14, 2019, in the Indian Intellectual Property Office, the disclosure of which are incorporated herein by reference in their entireties.

BACKGROUND

1. Field

The disclosure relates generally to a multiple radio access technology (multi-radio access technology (RAT) dual connectivity (MR-DC) system, and more particularly, to a method and apparatus for handling cell selection and reselection in the MR-DC system.

2. Description of the Related Art

In a long term evolution (LTE) network, a cell broadcasts a system information block 2 (SIB2) including a public land mobile network (PLMN)-InfoList-r15 if there is fifth generation (5G) coverage or new radio (NR) capability in the LTE cell area. The SIB2 upperLayerIndication notifies upper layers that a user equipment (UE) has entered a coverage area that offers 5G capabilities.

Operators prefer displaying a 5G indicator in the area where 5G might be available. As per the UE, a non-standalone architecture (NSA) evolved-universal terrestrial radio access network (E-UTRAN) new radio (NR)-dual connectivity (DC)(NSA EN-DC) UE shall display a "5G Basic" technology indicator when the NSA EN-DC UE is in an LTE cell, such as either a camped cell in a radio resource control (RRC) idle state, or an LTE PCell in an RRC connected state, which in an SIB2 includes the PLMN-InfoList-r15 information element (IE) (upper layerIndication-r15 set as TRUE).

If the UE is present in both the cell supporting 5G and the cell not supporting 5G, the UE may reselect any cell based on a cell-reselection criteria. Some problems are prevalent regarding the conventional cell selection and reselection for the 5G network. Specifically: 5G capability MR-DC support is not currently being considered for cell selection and re-selection, the UE may not be camped on a 5G supporting cell in an overlapping area of cells supporting 5G and not supporting 5G, and if the UE needs 5G services, the network has to handover to a 5G supporting cell based on NR measurement reports. These problems add delay to 5G cell processing, which is an inconvenience to the user.

Thus, there is a need in the art for a method and apparatus for handling cell selection and re-selection in an MR-DC system that cures the processing delays that are prevalent in the conventional art.

SUMMARY

An aspect of the disclosure is to address at least the above-mentioned problems and/or disadvantages and to provide at least the advantages described below.

Accordingly, an aspect of the disclosure is to provide a method and apparatus for handling cell selection and re-selection in an MR-DC system.

Another aspect of the disclosure is to provide a method and apparatus for detecting and identifying a first cell supporting a next generation (NG) MR-DC system based on a list of frequencies.

Another aspect of the disclosure is to provide a method and apparatus for camping to the identified first cell supporting the NG MR-DC system.

Another aspect of the disclosure is to provide a method and apparatus for handling cell selection and re-selection in an evolved-universal terrestrial radio access network (E-UTRAN) new radio (NR)-dual connectivity (DC)(EN-DC) architecture.

Another aspect of the disclosure is to provide a method and apparatus for handling cell selection and re-selection in an NG-radio access network (RAN)-evolved universal terrestrial radio access (E-UTRA)(NG-RAN-E-UTRA)-DC (NGEN-DC) architecture.

Another aspect of the disclosure is to provide a method and apparatus for handling cell selection and re-selection in an NR-E-UTRA-DC (NE-DC) architecture.

In accordance with an aspect of the disclosure, a method for handling cell selection by a user equipment (UE) in a wireless communication system is provided, with the method including scanning at least one frequency; obtaining at least one message; determining a first cell to camp to among at least one cell corresponding to the scanned at least one frequency, based on the obtained at least one message, by prioritizing a cell supporting a multiple radio access technology (RAT)-dual connectivity (DC) (MR-DC) than a cell not supporting the MR-DC among the at least one cell; and camping to the determined first cell.

In accordance with another aspect of the disclosure, a user equipment (UE) for handling cell selection in a wireless communication system is provided, the UE including a memory and at least one processor coupled with the memory, with the at least one processor being configured to scan at least one frequency, obtain at least one message, determine a first cell to camp to among at least one cell corresponding to the scanned at least one frequency, based on the obtained at least one message, by prioritizing a cell supporting a multiple radio access technology (RAT)-dual connectivity (DC) (MR-DC) than a cell not supporting the MR-DC among the at least one cell, and camp to the determined first cell.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
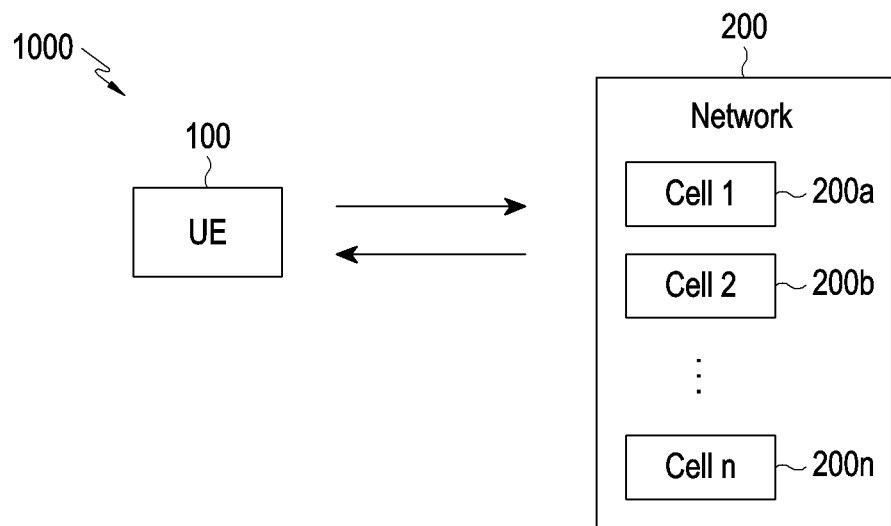
FIG. 1 illustrates an MR-DC system for handling cell selection, according to an embodiment.

Embodiments of the disclosure and the features and advantages thereof are explained more fully with reference to the detailed description and accompanying drawings. Descriptions of well-known functions and/or configurations are omitted for the sake of clarity and conciseness.

Also, the embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of how the embodiments herein can be practiced and to further enable those skilled in the art to practice the embodiments herein. Accordingly, the embodiments should not be construed as limiting the scope of the disclosure.

The embodiments may be described and illustrated in terms of blocks which perform a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, or hardwired circuits, and may optionally be driven by firmware and software. The circuits may, for example, be embodied in one or more semiconductor chips, or on substrate supports such as printed circuit boards (PCBs). The circuits constituting a block may be implemented by dedicated hardware, by one or more programmed microprocessors and associated circuitry, or by a combination of dedicated hardware to perform some functions of the block and a processor to perform other functions of the block. Each block may be physically separated into two or more interacting and discrete blocks without departing from the scope of the disclosure, and the blocks of the embodiments may be physically combined into more complex blocks without departing from the scope of the disclosure The accompanying drawings are used to assist in the understanding of various technical features and it should be understood that the embodiments presented herein are not limited by the accompanying drawings. As such, the present disclosure should be construed to extend to any alterations, equivalents, and substitutes in addition to those which are particularly set forth in the accompanying drawings.

Terms such as "first" and "second" may be used herein to distinguish one element from another in various elements, but these elements should not be limited by these terms.

The labels or names of the components described herein are used only for illustrative purposes and do not limit the scope of the disclosure. One or more components can be combined together to perform the same or substantially similar function to handle the cell selection in the MR-DC system.

Embodiments as described below achieve a method and apparatus for handling cell selection in an MR-DC system, including scanning, by a UE, a list of frequencies for initial camping, identifying, by the UE, the first cell supporting an MR-DC based on the list of frequencies, and camping, by the UE, to the identified first cell.

In the existing systems and methods, the UE does not give a preference to master nodes (MNs) having dual connectivity support during cell selection and reselection procedures. The cell selection and reselection for the 5G system are provided below:

1. MR-DC with the Evolved Packet Core (EPC):

An E-UTRA network (E-UTRAN) supports MR-DC via EN-DC, in which a UE is connected to one eNB that acts as a master node (MN) and one en-gNB that acts as a secondary node (SN). The UE does not give preference to LTE cells having EN-DC support while camping or reselecting cells.

2. MR-DC with the 5G Core (5GC) Network 2.1 E-UTRA-NR Dual Connectivity:

The NG-RAN supports the NGEN-DC, in which a UE is connected to one ng-eNB that acts as an MN and one gNB that acts as an SN. The UE does not give preference to an ng-eNB which has NGEN-DC support during cell camping and reselection. The gNB is a node providing NR user plane and control plane protocol terminations towards the UE, and connected via the NG interface to the 5GC. And, the ng-eNB node providing E-UTRA user plane and control plane protocol terminations towards the UE, and connected via the NG interface to the 5GC.

2.2 NR-E-UTRA Dual Connectivity:

The NG-RAN supports the NE-DC, in which a UE is connected to one gNB that acts as an MN and one ng-eNB that acts as an SN. The UE does not give preference to the gNB which has NE-DC support during cell camping and reselection.

As disclosed herein, the UE provides preference to the E-UTRAN cells supporting the MR-DC via an EN-DC, as per upperLayerIndication-r15 indication in an SIB2.

In the MR-DC with the 5GC, the UE provides preference to the cell supporting the NGEN-DC and cells supporting the NE-DC.

Unlike conventional methods and systems, in the present disclosure, the UE provides preference to 4G cells supporting 5G, as per upperLayerIndication-r15 indication in the SIB2. For camping, the UE selects the cell based on whether stored frequency information is present in the UE. Stored frequencies having 5G support are scanned first for initial camping. If the UE finds a suitable cell with 5G support, the UE camps on it. If the device finds a new cell with 5G support, a stored information database is updated with the new cell with corresponding frequency information. If there is no stored information regarding the cell selection, the UE starts the search for an initial cell selection in which the UE scans frequencies for a particular time duration and finds a suitable cell for the camping. For cell reselection, the UE considers frequency to be the highest priority in the EN-DC mode when the reselected cell (candidate cell) is broadcasting 5G support in the SIB2. This results in providing an improved user experience and faster establishment of the 5G bearer.

Embodiments of the disclosure are adapted in the 3GPP TS 36.331 and 3GPP TS 38.331 standard.

A method provides a cell selection and reselection preference to LTE cells having the MR-DC support, i.e., an LTE anchor cell having dual connectivity with the NR.

Another method provides the cell selection and reselection preference to the NR cell having the MR-DC support i.e., an NR anchor cell having dual connectivity with LTE.

In an embodiment, preference can be given based on the following two indicators:

1. MR-DC availability indicator: In EN-DC and NGEN-DC, the indicator is "upperlayerindicator-r15 in PLMN-infolist-r15 IE which is provided in the SIB2, and 2. Based on 5GC network connection availability: In the NGEN-DC, LTE cells can have connection to 5GC, and the UE will give preference to such LTE cells. In the NE-DC, a device can prefer NR cells having LTE cells connected to the 5GC.

Referring now to the drawings, and more particularly to FIGS. 1 through 11, there are shown preferred embodiments.

FIG. 1 illustrates an MR-DC system 1000 for handling cell selection, according to an embodiment. The MR-DC system 1000 includes a UE 100 and a network 200 comprising a plurality of cells 200a-200n. The UE 100 includes but is not limited to, a cellular phone, tablet, smart phone, laptop, personal digital assistant (PDA), global positioning system, multimedia device, video device, internet of things (IoT) device, smart watch, or game console. The UE 100 may also be referred to as a mobile station, subscriber station, mobile unit, subscriber unit, wireless unit, remote unit, mobile device, wireless device, wireless communications device, mobile subscriber station, access terminal, mobile terminal, wireless terminal, remote terminal, handset, user agent, or mobile client. The UE 100 is compliant with multiple communication protocols that may operate as a multi-mode device by communicating within an NG system. Each of the plurality of cells 200a-200b may be an LTE cell or an NR cell based on one of MR-DC availability and a 5GC connectivity, but are not limited thereto.

The UE 100 is configured to scan a list of frequencies for initial camping. After scanning the list, the UE 100 is configured to detect/identify a first cell 200a supporting an NG MR-DC.

The UE 100 is configured to detect/identify the first cell 200a supporting the NG MR-DC by determining the first cell 200a indicating an NG core network support in an SIB2 message using IE CellAccessRelatedInfoList-5GC in the NGEN-DC. The UE 100 is configured to detect/identify the first cell 200a supporting the NG MR-DC by determining one of an MR-DC type NGEN-DC support and an MR-DC type EN-DC support based on an MR-DC availability indication. The MR-DC availability indication comprises an upperLayerIndication-r15 indication in the SIB2 message.

Figure 2:
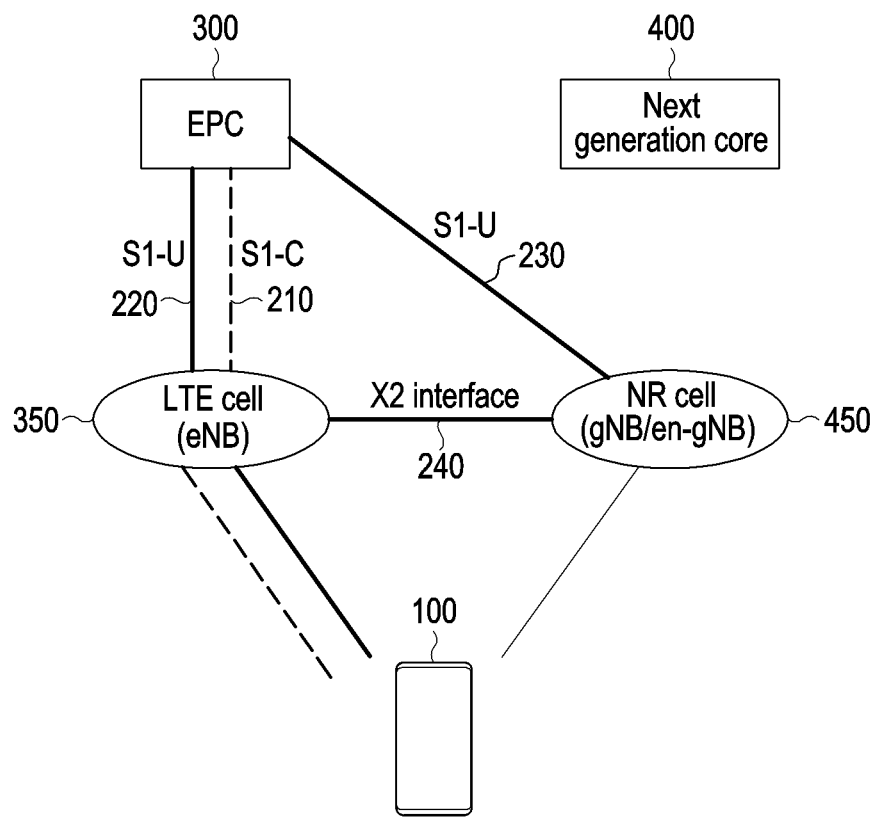
FIG. 2 illustrates an MR-DC system for handling cell selection in an EN-DC architecture, according to an embodiment.

FIG. 2 illustrates an MR-DC system for handling cell selection in an EN-DC architecture, according to an embodiment. As shown in FIG. 2, the UE 100 is connected to one eNB of an LTE cell 350 that acts as an MN and one gNB of an NR cell 450 that acts as an SN. The eNB is connected to an EPC 300 via an S1-C 210 interface and an S1-U 220 interface, and an en-gNB of the NR cell 450 is connected to the EPC 300 via an S1-U 230 interface. The eNB and the gNB connect to each other via an X2 interface 240. The MR-DC mechanism is referred to as the EN-DC architecture, in which the anchors of the control plane are always located in an LTE RAN, that is, the S1-C interface is terminated by the eNB.

In the SIB2, plmn-InfoList-r15 IE has upperLayerIndication-r15 indication to indicate the EN-DC support. The following is the logic indicating the EN-DC support:

```
{
PLMN-InfoList-r15 ::=    SEQUENCE (SIZE (1..maxPLMN-r11)) OF PLMN-Info-r15
PLMN-Info-r15 ::= SEQUENCE {
   upperLayerIndication-r15
   ENUMERATED {true}    OPTIONAL      -- Need OR
}
```

Figure 3:
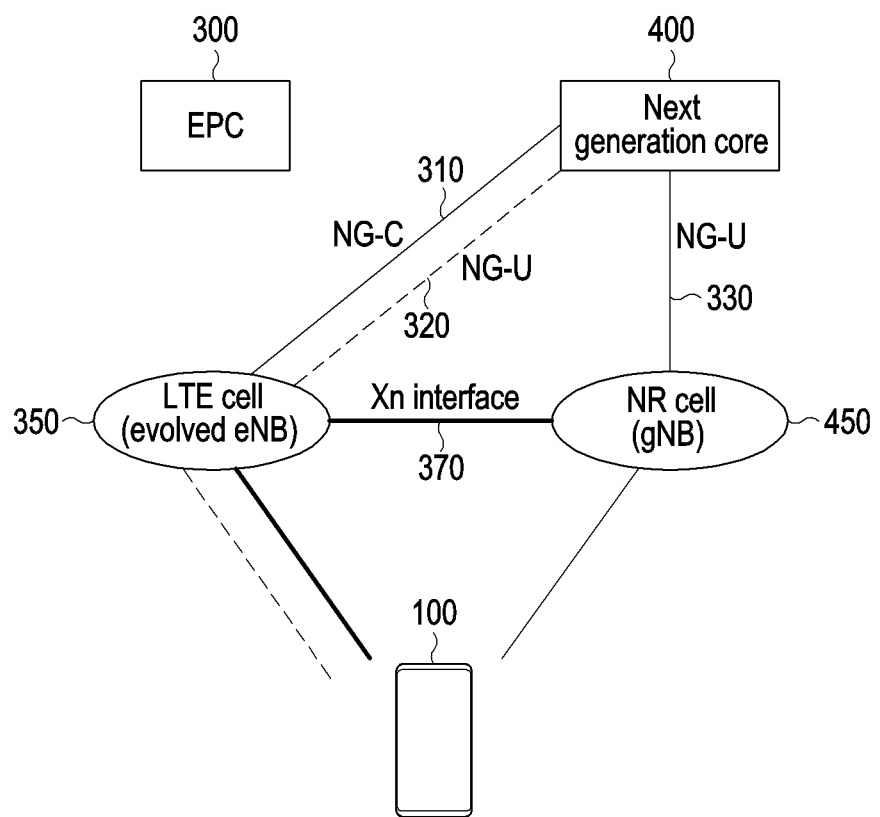
FIG. 3 illustrates an MR-DC system for handling cell selection in an NGEN-DC architecture, according to an embodiment.

FIG. 3 illustrates an MR-DC system for handling cell selection in an NGEN-DC architecture, according to an embodiment. As shown in FIG. 3, the UE 100 is connected one evolved eNB of an LTE cell 350 that acts as the MN and one gNB of an NR cell 450 that act as the SN. The evolved eNB is connected to the new 5GC 400 via an NG-C 310 interface and NG-U 320 interface, and the gNB is connected to the 5GC 400 via an NG-U 330 interface. The NG-C 310 interface is a control plane interface between the evolved eNB and the new 5GC 400, and the NG-U 320 interface is a user plane interface between the evolved eNB and the new 5GC 400. And, the NG-U 330 interface is a user plane interface between the gNB and the new 5GC 400. The evolved eNB 350 and the gNB 450 connect each other via Xn 340 interface. The MR-DC mechanism is referred to as the NGEN-DC.

In another example, the LTE cell indicates the 5GC network support in the SIB1 using the following IE: CellAccessRelatedInfoList-5GC. The below logic field contains a public land mobile network (PLMN) list and a list allowing signalling of access related information per PLMN for PLMNs that provides connectivity to the 5GC. One PLMN can be included in only one entry of this list.

```
{
CellAccessRelatedInfo-5GC-r15 ::= SEQUENCE {
plmn-IdentityList-r15         PLMN-IdentityList-r15,
ran-AreaCode-r15                    RAN-AreaCode-r15 OPTIONAL, -- Need OR
trackingAreaCode-5GC-r15     TrackingAreaCode-5GC-r15,
cellIdentity-5GC-r15          CellIdentity-5GC-r15
}
```

-continued

```
CellIdentity-5GC-r15 ::= CHOICE{
cellIdentity-r15 CellIdentity,
cellId-Index-r15 INTEGER (1..maxPLMN-r11)
}
```

The following Table 1 and Table 2 indicate the stored information cell selection.

TABLE 1

| Index | E-UTRAN frequency | PLMN | 5G Support |
|---|---|---|---|
| 1 | 10776 | 312-001 | No |
| 2 | 10812 | 311-002 | Yes |

TABLE 2

| Index | E-UTRAN frequency | PLMN | 5GC Connected? |
|---|---|---|---|
| 1 | 10776 | 312-001 | No |
| 2 | 10812 | 311-002 | Yes |

As shown in Table 1, the stored information cell selection may include an E-UTRAN frequency and 5G support information per PLMN. Alternatively, as shown in Table 2, the stored information cell selection may include an E-UTRAN frequency and 5G connectivity per PLMN.

Figure 4:
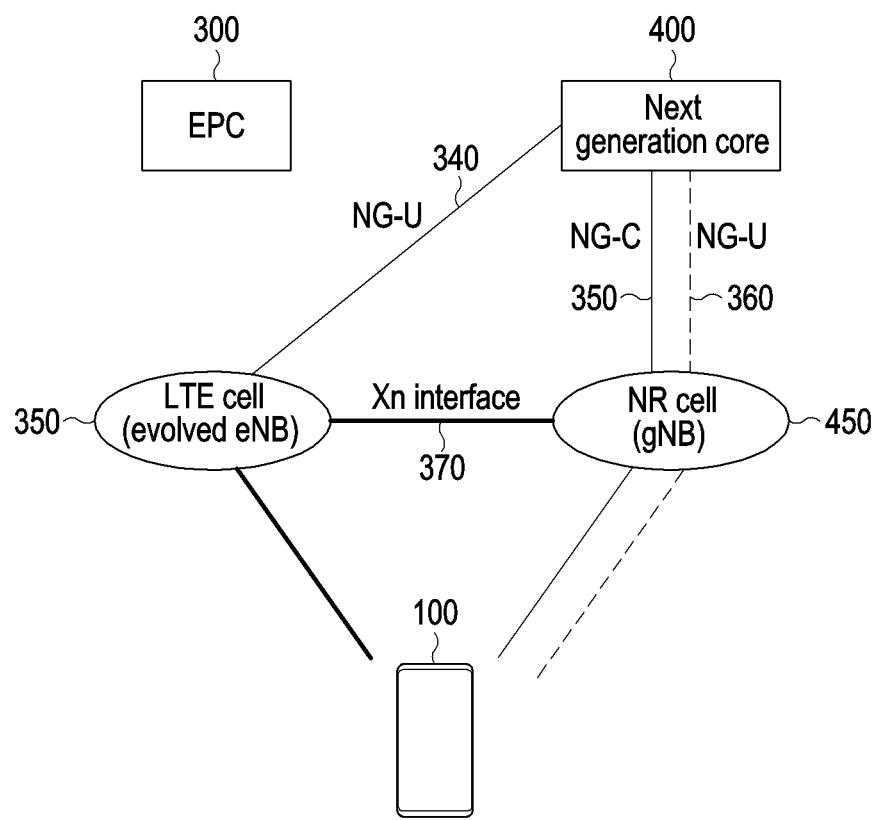
FIG. 4 illustrates an MR-DC system for handling cell selection in an NE-DC architecture, according to an embodiment.

FIG. 4 illustrates an MR-DC system for handling cell selection in an NE-DC architecture, according to an embodiment. As shown in FIG. 4, the UE 100 is connected one gNB of an NR cell 450 that acts as an MN and one evolved eNB of an LTE cell 350 that acts as the SN. The gNB is connected to the new 5GC 400 via the NG-C 350 and NG-U 360 interface, and the evolved eNB is connected to the new 5GC 400 via an NG-U 340 interface. The NG-C 350 interface is a control plane interface between the gNB and the new 5GC 400, and the NG-U 360 interface is a user plane interface between the gNB and the new 5GC 400. And, the NG-U 340 interface is a user plane interface between the evolved eNB and the new 5GC 400. The gNB and the evolved eNB connect each other via Xn 340 interface. The MR-DC mechanism is referred to as the NE-DC.

The UE 100 is configured to detect/identify the first cell supporting the NG MR-DC by determining the first cell comprising MR-DC type NE-DC support.

In an example, the NR cell indicates the MR-DC support in the SIB1 using following IE:

CellAccessRelatedInfo-EUTRA-5GC. The IE CellAccessRelatedInfo-EUTRA-5GC indicates cell access related information for an LTE cell connected to the 5GC.

```
{
CellAccessRelatedInfo-EUTRA-5GC ::= SEQUENCE {
plmn-IdentityList-eutra-5gc,
trackingAreaCode-eutra-5gc TrackingAreaCode,
ranac-5gc RAN-AreaCode OPTIONAL,
cellIdentity-eutra-5gc CellIdentity-EUTRA-5GC
}
```

Table 3 below indicates the stored information cell selection.

TABLE 3

| Index | NR frequency | PLMN | 4G DC support? |
|---|---|---|---|
| 1 | 10776 | 312-001 | No |
| 2 | 10812 | 311-002 | Yes |

As shown in Table 3, the stored information cell selection may include an NR frequency and 4G DC support information per PLMN.

After detecting/identifying the first cell supporting the NG MR-DC, the UE 100 is configured to camp to the identified first cell supporting the NG MR-DC support.

The UE 100 is configured to parse a message associated with the identified first cell 200a. The message can be the SIB1 or SIB2. After parsing the message, the UE 100 is configured to determine whether the identified first cell 200a supports the NG MR-DC for a pre-determined time period. Based on the determination, the UE 100 is configured to camp to the identified first cell 200a supporting the NG MR-DC.

The UE 100 is configured to parse the message associated with the identified first cell 200a. After parsing the message, the UE 100 is configured to determine whether the identified first cell 200a supports the NG MR-DC for the pre-determined time period. If the identified first cell 200a does not support the NG MR-DC for the pre-determined time period, the UE 100 is configured to detect that a second cell 200b supports the NG MR-DC and camp to the identified second cell 200b having the NG MR-DC support.

The UE 100 stores the list of frequencies based on an upperLayerIndication-r15 indicated in the message, and updates information corresponding to the first cell 200a and the second cell 200b in a memory, wherein the information includes a type of the first cell 200a and the second cell 200b and frequency value of the first cell 200a and the second cell 200b.

As shown in Table 4 below, the SIB2 indicated in the PLMN list info is updated in the database (DB) to indicate 5G support.

TABLE 4

| Index | E-UTRAN frequency | PLMN | 5G Support |
|---|---|---|---|
| 1 | 10776 | 312-001 | No |
| 2 | 10812 | 311-002 | Yes |
| 3 | 10910 | 310-003 | No |
| 4 | 6712 | 310-004 | Yes |

As shown in Table 5 below during stored frequency cell selection, the UE 100 searches stored frequencies in this order to give preference to the cell 200a or 200b supporting 5G.

TABLE 5

| Index | E-UTRAN frequency | PLMN | 5G Support |
|---|---|---|---|
| 2 | 10812 | 311-002 | Yes |
| 4 | 6712 | 310-004 | Yes |
| 1 | 10776 | 312-001 | No |
| 3 | 10910 | 310-003 | No |

Referring to Table 5, a preference is given to the E-UTRAN frequency of the PLMN supporting 5G and aligned from the top of the table. The UE 100 measures at least one network parameter for a plurality of neighboring cells, determines the NG MR-DC support and signal strength of the plurality of neighboring cells by reading one of the message and at least one network parameter, and reselects to at least one neighboring cell from the plurality of neighboring cells which is determined to have NG MR-DC support and has signal strength greater than the signal strength of a current cell.

In another embodiment, the UE 100 measures at least one network parameter (e.g., SIB 2 information) for a plurality of neighboring cells, determines the NG MR-DC support and signal strength of the plurality of neighboring cells by reading one of the message and at least one network parameter, and determines NG MR-DC support and signal strength of the plurality of neighboring cells until an appropriate neighboring cell having the NG MR-DC support and signal strength greater than the signal strength of the current cell is found.

The UE 100 is configured to detect that the first cell and the second cell do not support the MR-DC for the pre-determined time period, and to camp to the first cell or the second cell, neither of which supports the MR-DC.

The UE 100 is configured to decide to reselect a third cell from the first cell or the second cell, to measure the MR-DC support or the 5GC support for the plurality of neighboring cells, and to select the third cell from the plurality of neighboring cells which is determined to have the MR-DC support or the 5GC support.

Figure 5:
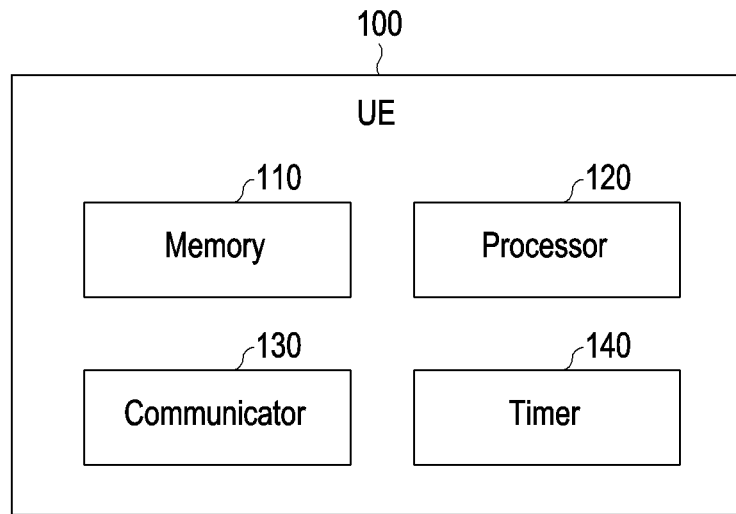
FIG. 5 illustrates various elements of a UE, according to an embodiment.

Although FIG. 1 shows various hardware components of the MR-DC system 1000, it is to be understood that other embodiments are not limited thereto. In other embodiments, the MR-DC system 1000 may include fewer or more components. FIG. 5 illustrates various elements of the UE 100, according to an embodiment. The UE 100 includes a memory 110, a processor 120, a communicator 130 and a timer 140. The processor 120 is configured to execute instructions stored in the memory 110 and to perform various processes. The communicator 130 is configured for communicating internally between internal hardware components and with external devices via one or more networks.

The memory 110 stores instructions to be executed by the processor 120 and may include non-volatile storage elements, such as magnetic hard discs, optical discs, floppy discs, flash memories, or forms of an electrically programmable read-only memory (EPROM) or an electrically erasable and programmable read-only memory (EEPROM). The memory 110 may be considered a non-transitory storage medium. The term "non-transitory" may indicate that the storage medium is not embodied in a carrier wave or a propagated signal. However, the term "non-transitory" should not be interpreted as the memory 110 being non-movable or stationary. The memory 110 can be configured to store varying amounts of information. In certain examples, a non-transitory storage medium may store data that can, over time, change (e.g., in a random access memory (RAM) or a cache).

The processor 120 is configured to scan the list of frequencies for initial camping. After scanning the list, the processor 120 is configured to detect the first cell 200*a* supporting the NG MR-DC.

The processor 120 is configured to detect the first cell 200*a* supporting the NG MR-DC by determining the first cell 200*a* indicating the NG core network support in the message using IE CellAccessRelatedInfoList-5GC in the NGEN-DC. The processor 120 is further configured to detect the first cell 200*a* supporting the NG MR-DC by determining one of the MR-DC type NGEN-DC support and the MR-DC type EN-DC support based on the MR-DC availability indication. The UE 100 is further configured to detect the first cell 200*a* supporting the NG MR-DC by determining the first cell comprising 200*an* MR-DC type NE-DC support.

After detecting the first cell 200*a* supporting the NG MR-DC, the processor 120 is configured to camp to the identified first cell supporting the NG MR-DC support.

The processor 120 is configured to parse the message associated with the identified first cell 200*a*. After parsing the message, the processor 120 is configured to determine whether the identified first cell 200*a* supports the NG MR-DC for the pre-determined time period using the timer 140. Based on the determination, the processor 120 is configured to camp to the identified first cell 200*a* supporting the NG MR-DC. If the identified first cell 200*a* does not support the NG MR-DC for the pre-determined time period, the processor 120 is configured to detect that the second cell 200*b* supports the NG MR-DC and camp to the identified second cell 200*b* having the NG MR-DC support.

The memory 110 stores the list of frequencies based on the upperLayerIndication-r15 indicated in the message, and updates information corresponding to the first cell 200*a* and the second cell 200*b*, wherein the information includes the type of the first cell 200*a* and the second cell 200*b* and frequency value of the first cell 200*a* and the second cell 200*b*.

The processor 120 measures at least one network parameter for the plurality of neighboring cells, determines the NG MR-DC support and signal strength of the plurality of neighboring cells by reading one of the message and at least one network parameter, and reselects to at least one neighboring cell from the plurality of neighboring cells which is determined to have NG MR-DC support and has signal strength greater than the signal strength of a current cell, The processor 120 measures at least one network parameter for a plurality of neighboring cells, determines the NG MR-DC support and signal strength of the plurality of neighboring cells by reading one of the message and at least one network parameter, and determines NG MR-DC support and signal strength of the plurality of neighboring cells until an appropriate neighboring cell having the NG MR-DC support and signal strength greater than the signal strength of the current cell is found.

The processor 120 is configured to detect that the first cell and the second cell do not support the MR-DC for the pre-determined time period, and to camp to the first cell or the second cell, neither of which cell supports the MR-DC.

The processor 120 is configured to decide to reselect the third cell from the first cell or the second cell, to measure the MR-DC support or the 5GC support for the plurality of neighboring cells, and to select the third cell from the plurality of neighboring cells which is determined to have the MR-DC support or the 5GC support.

Figure 6:
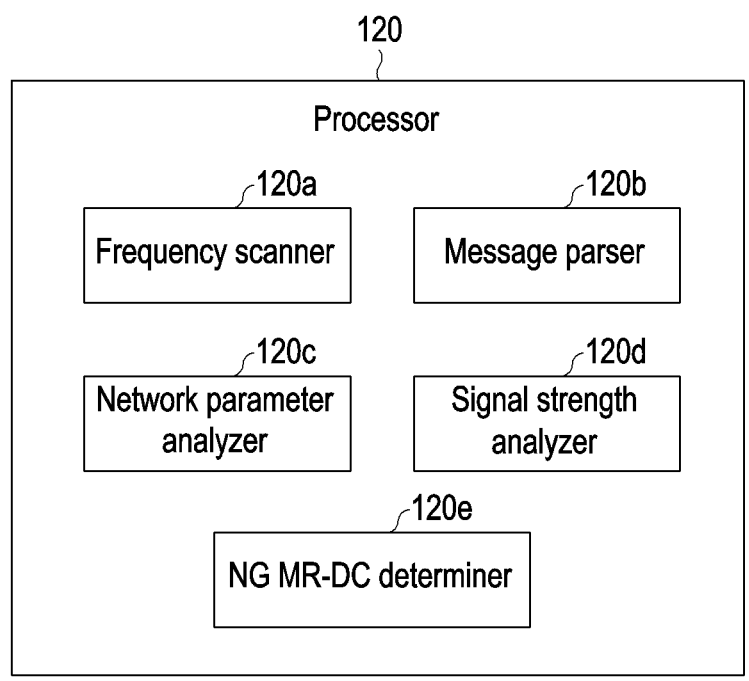
FIG. 6 illustrates various elements of a processor, according to an embodiment.

Although FIG. 5 shows various hardware components of the UE 100, it is to be understood that other embodiments are not limited thereon. That is, the UE 100 may include fewer or more components. FIG. 6 illustrates various elements of the processor 120, according to an embodiment. The processor 120 includes a frequency scanner 120*a*, a message parser 120*b*, a network parameter analyzer 120*c*, a signal strength analyzer 120*d*, and an NG MR-DC determiner 120*e*.

The frequency scanner 120*a* is configured to scan the list of frequencies for initial camping. After scanning the list, the NG MR-DC determiner 120*e* is configured to detect the first cell 200*a* supporting the NG MR-DC.

The NG MR-DC determiner 120*e* is configured to detect the first cell 200*a* supporting the NG MR-DC by determining the first cell 200*a* indicating the NG core network support in the message using IE CellAccessRelatedInfoList-5GC in the NGEN-DC. The NG MR-DC determiner 120*e* is further configured to detect the first cell 200*a* supporting the NG MR-DC by determining one of the MR-DC type NGEN-DC support and the MR-DC type EN-DC support based on the MR-DC availability indication. The NG MR-DC determiner 120*e* is further configured to detect the first cell 200*a* supporting the NG MR-DC by determining the first cell 200*a* comprising MR-DC type NE-DC support.

After detecting the first cell 200*a* supporting the NG MR-DC, the NG MR-DC determiner 120*e* is configured to camp to the identified first cell supporting the NG MR-DC support.

The message parser 120*b* is configured to parse the message associated with the identified first cell 200*a*. After parsing the message, the NG MR-DC determiner 120*e* is configured to determine whether the identified first cell 200*a* supports the NG MR-DC for the pre-determined time period using the timer 140. Based on the determination, the NG MR-DC determiner 120*e* is configured to camp to the identified first cell 200*a* supporting the NG MR-DC.

The processor 120 is configured to parse the message associated with the identified first cell 200*a*. After parsing the message, the NG MR-DC determiner 120*e* is configured to determine whether the identified first cell 200*a* supports the NG MR-DC for the pre-determined time period using the timer 140. If the identified first cell 200*a* does not support the NG MR-DC for the pre-determined time period, the NG MR-DC determiner 120*e* is configured to detect that the second cell 200*b* supports the NG MR-DC and camps to the identified second cell 200*b* having the NG MR-DC support.

The network parameter analyzer 120*c* measures at least one network parameter for the plurality of neighboring cells. The network parameter analyzer 120*c* and the signal strength analyzer 120*d* determine the NG MR-DC support and signal strength of the plurality of neighboring cells by reading one of the message and at least one network parameter. The NG MR-DC determiner 120*e* reselects to at least one neighboring cell from the plurality of neighboring cells which is determined to have NG MR-DC support and has signal strength greater than the signal strength of a current cell.

In another embodiment, the network parameter analyzer 120*c* measures at least one network parameter for the plurality of neighboring cells. The network parameter analyzer 120*c* and the signal strength analyzer 120*d* determine the NG MR-DC support and signal strength of the plurality of neighboring cells by reading one of the message and at least one network parameter. The NG MR-DC determiner 120*e* determines NG MR-DC support and signal strength of the plurality of neighboring cells until an appropriate neighboring cell having the NG MR-DC support and signal strength greater than the signal strength of the current cell is found.

Figure 7:
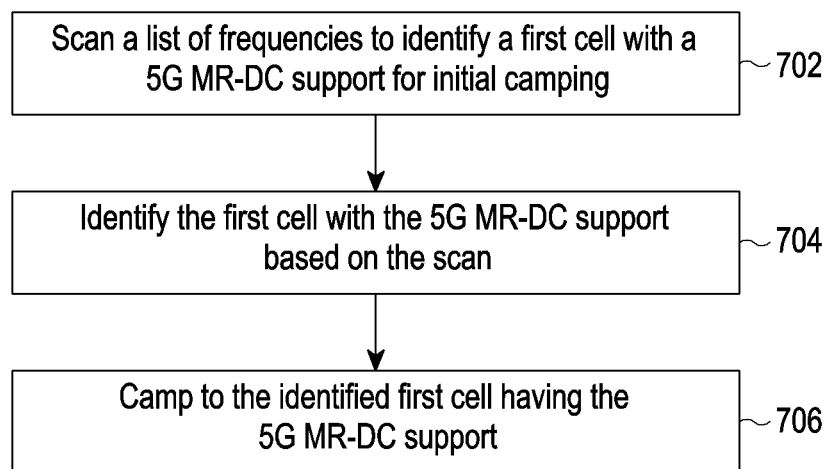
FIG. 7 illustrates a method for handling cell selection in the MR-DC system, according to an embodiment.

Although FIG. 5 shows various hardware components of the processor 120, it is to be understood that other embodiments are not limited thereon. That is, the processor 120 may include fewer or more components. FIG. 7 illustrates a method for handling cell selection in the MR-DC system, according to an embodiment, and is performed by the processor.

In step 702, the list of frequencies for initial camping is scanned. In step 704, the first cell supporting the NG MR-DC is detected based on the list of frequencies. In step 706, the UE camps to the identified first cell 200*a* supporting the NG MR-DC support.

The steps in the flow diagram 700 may be performed in the order presented, in a different order or simultaneously. Further, in some embodiments, some of the steps may be omitted, added, modified, or skipped, without departing from the scope of the disclosure.

Figure 8A:
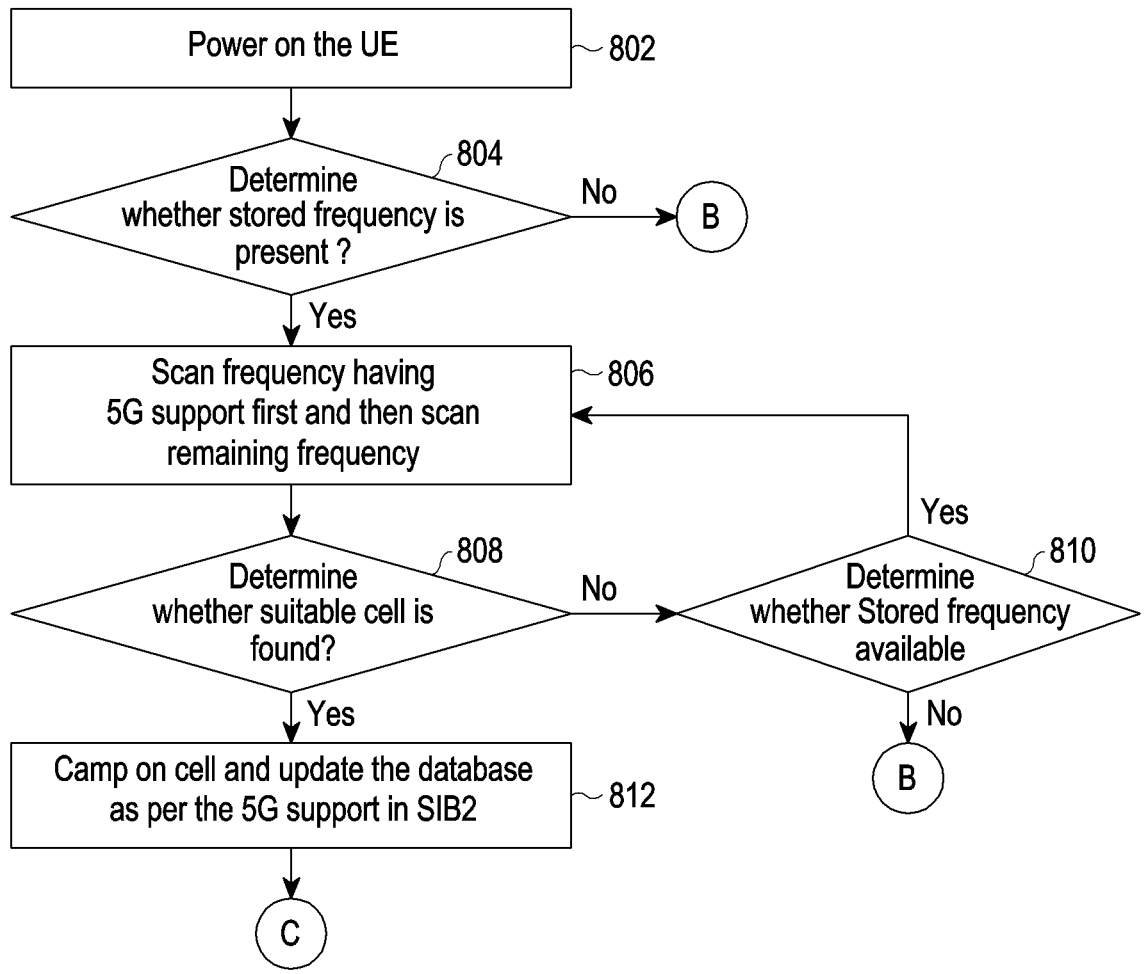
FIGS. 8A, 8B and 8C illustrate a method for handling cell selection in the MR-DC system, according to an embodiment.
Figure 8B:
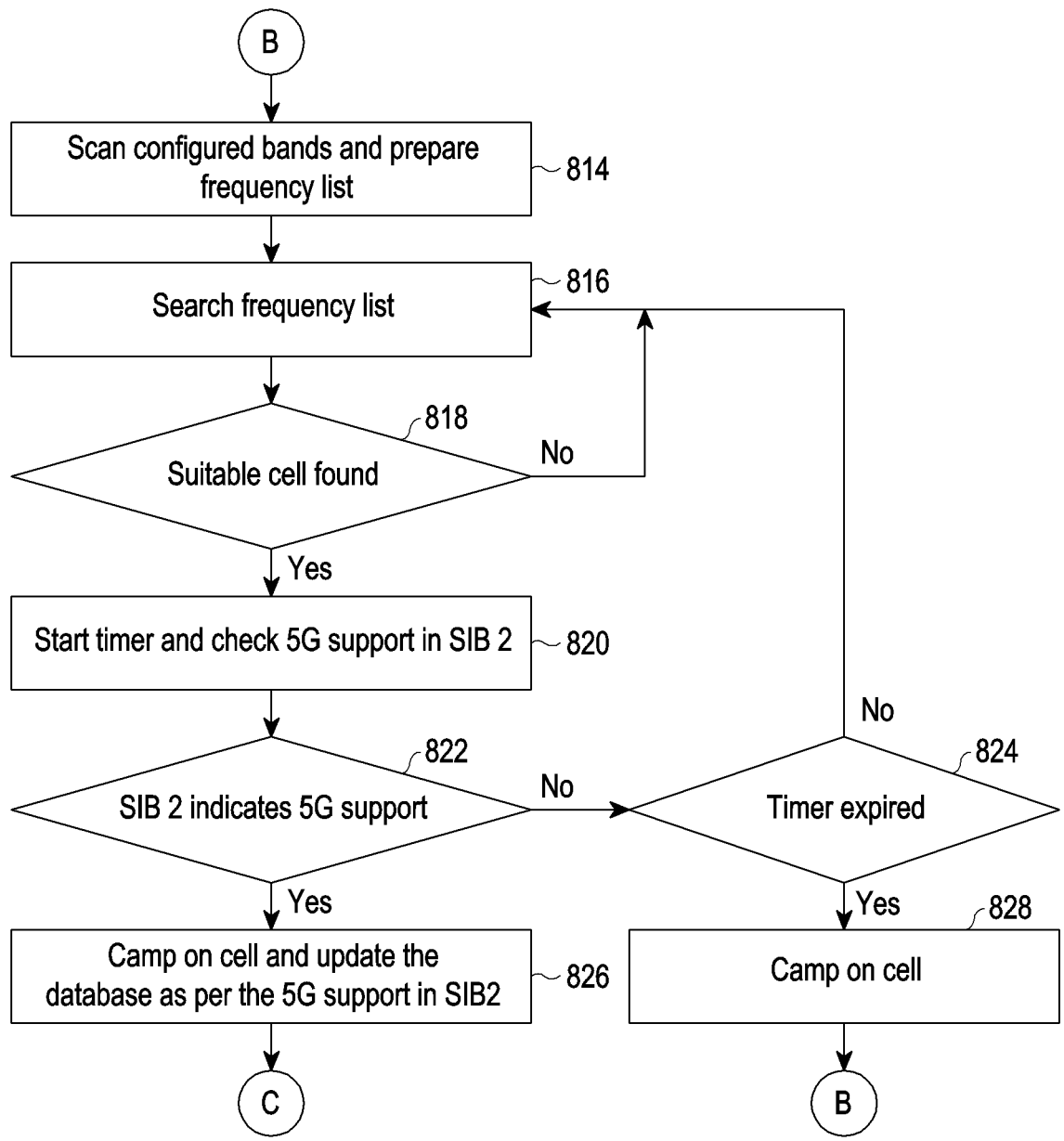
Figure 8C:
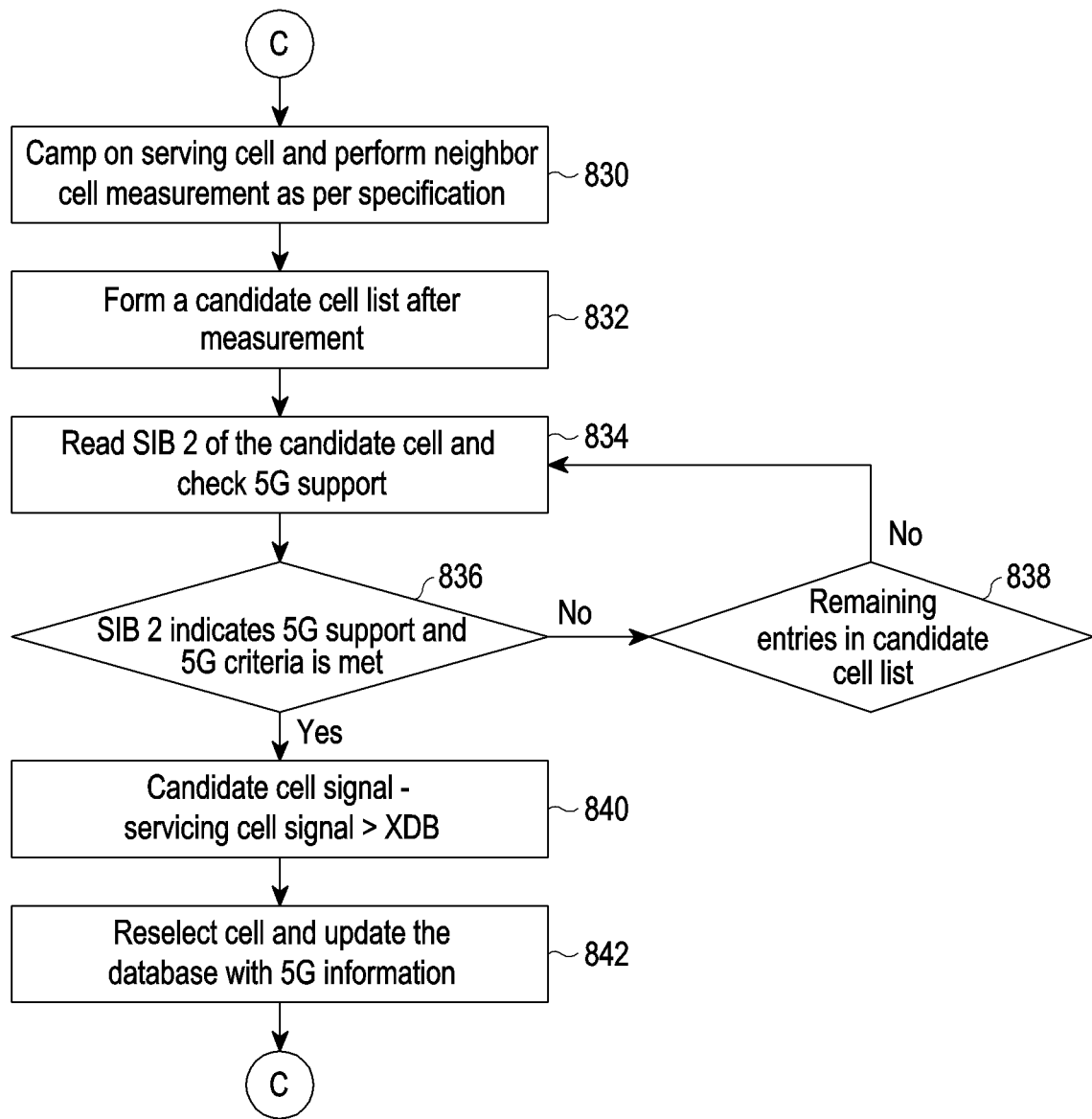

FIGS. 8A, 8B and 8C illustrate a method for handling cell selection in the MR-DC system, according to an embodiment.

In step 802, the UE 100 powers on. In step 804, the UE 100 determines whether the stored frequency is present. If the stored frequency is present. If so, in step 806, the UE 100 scans frequency having the 5G support first and then scans remaining frequency. In step 808, the UE 100 determines whether suitable cell (i.e., 5G support cell) is found. If the suitable cell is found then, in step 812, the UE 100 camps on the cell 200*a* and updates frequency value the memory 110 as per the 5G support in the SIB2. If the suitable cell is not found, in step 810, the UE 100 determines whether the stored frequency is available. If the stored frequency is available, in step 806, the UE 100 scans frequency having the 5G support first and scans remaining frequency.

If in step 810 the stored frequency is not available, in step 814, the UE 100 scans configured bands and prepares the frequency list. In step 816, the UE 100 searches the frequency list. In step 818, the UE 100 determines whether the suitable cell is found. If the suitable cell is found, in step 820, the UE 100 starts the timer 140 and checks 5G support in the SIB 2. If the suitable cell is not found, in step 816, the UE 100 searches the frequency list. A timer "T" value is implementation dependent to minimize delay in initial camping.

In step 822, the UE 100 determines whether the SIB 2 indicates 5G support. If the SIB 2 indicates 5G support, the UE 100 camps on the cell 200*a* and updates the memory 110 as per the 5G support in the SIB2 in step 826. If the SIB 2 does not indicate the 5G support, the UE 100 checks whether the timer 140 is expired in step 824. If the timer 140 is expired, the UE 100 camps on the cell 200*a* in step 828. If the timer 140 is not expired, in step 816, the UE 100 searches the frequency list.

In step 830, the UE 100 camps on the serving cell and performs neighbor cell measurement as per specification. In step 832, the UE 100 forms a candidate cell list after measurement. In step 834, the UE 100 reads the SIB 2 of the candidate cell and checks 5G support. In step 836, the UE 100 determines whether the SIB 2 indicates 5G support and 5G criteria is met. If The SIB 2 does not indicate the 5G support and 5G criteria does not met, in step 838, the UE 100 provides remaining entries in candidate cell list. If the SIB 2 indicates the 5G support and 5G criteria is met, in step 840, the UE 100 determines that the servicing cell signal subtracted from the candidate cell signal is greater than X Parameter (XDB or X Base). The parameter "X" is configurable and can be any radio signal parameter that prevents ping-ponging effect due to frequency reselection. In step 842, the UE 100 reselects a cell and updates the database with 5G information.

If any candidate cell is found with 5G support in the SIB2, the device will reselect the cell if the following conditions are met:
S criteria are satisfied (Refer to Table 6),
The candidate cell is better than the service cell by "X" db, and
Other reselection criteria is met.

The cell selection criterion S in normal coverage is fulfilled, when
Srxlev>0 AND Squal>0
where:

$$Srxlev = Qrxlevmeas - (Qrxlevmin + Qrxlevminoffset) - Pcompensation - Qoffset_{temp}$$

$$Squal = Qqualmeas - (Qqualmin + Qqualminoffset) - Qoffset_{temp}$$

Where, as shown below in Table 6:

TABLE 6

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ considered in the Srxlev evaluation as a result of a periodic search for a higher priority PLMN while camped normally in a visited public land mobile network (VPLMN) |
| $Q_{qualminoffset}$ | Offset to the signalled $Q_{qualmin}$ considered in the Squalevaluation as a result of a periodic search for a higher priority PLMN while camped normally in a VPLMN |
| Pcompensation | $max(P_{EMAX} - P_{PowerClass}, 0)$ (dB) |
| $P_{EMAX}$ | Maximum TX power level a UE may use when transmitting on the uplink in the cell (dBm) |
| $P_{PowerClass}$ | Maximum RF output power of the UE (dBm) according to the UE power class as defined in |

The steps in the flow diagram 800 may be performed in the order presented, in a different order or simultaneously. Some of the steps may be omitted, added, modified, or skipped, without departing from the scope of the disclosure.

Figure 9:
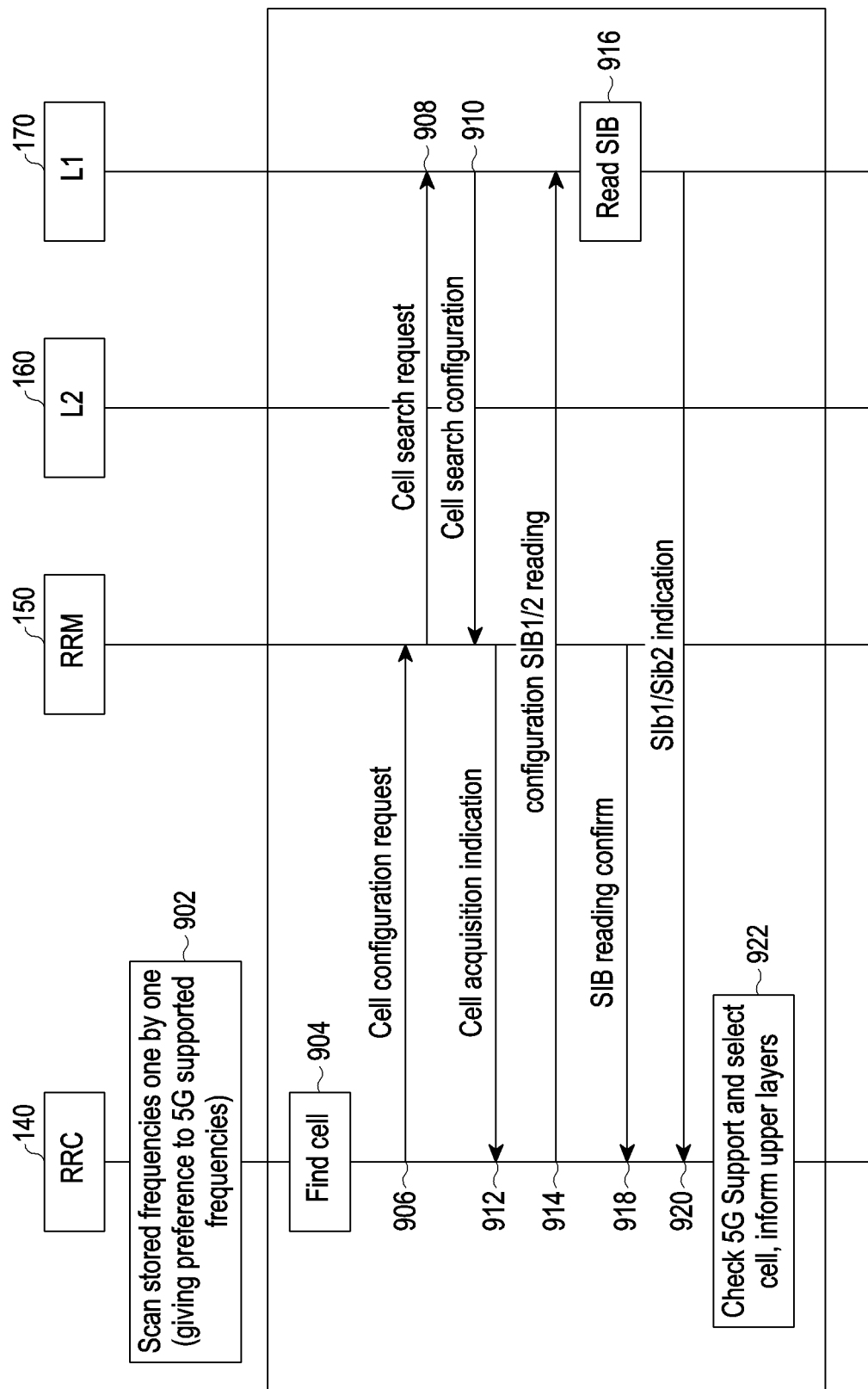
FIG. 9 illustrates a method for cell selection from stored information, according to an embodiment.

FIG. 9 illustrates a method for cell selection from the stored information, according to an embodiment.

In step 902, the RRC 140 scans stored frequencies one by one (giving preference to the 5G supported frequencies). In step 904, the RRC 140 finds the cell 210a and the RRC 140 sends the cell configuration request to the RRM 150 in step 906. In step 908, the RRM 150 sends the cell search request to the L1 layer 170. In step 910, the L1 layer 170 sends the cell search configuration to the RRM 150. In step 912, the RRM 150 sends the cell acquisition indication to the RRC 140. In step 914, the RRC 140 sends the SIB1/SIB2 information to the L1 layer 170 through the RRM 150. In step 916, the L1 layer 170 reads the SIB1 and SIB2. In step 918, the RRM 150 sends the SIB reading confirm to the RRC 140. In step 920, the L1 layer 170 sends the SIb1/SIB 2 indication to the RRC 140 through L2 layer 160. In step 922, the RRC 140 determines the 5G support, selects the cell 200a and informs the upper layers.

Figure 10:
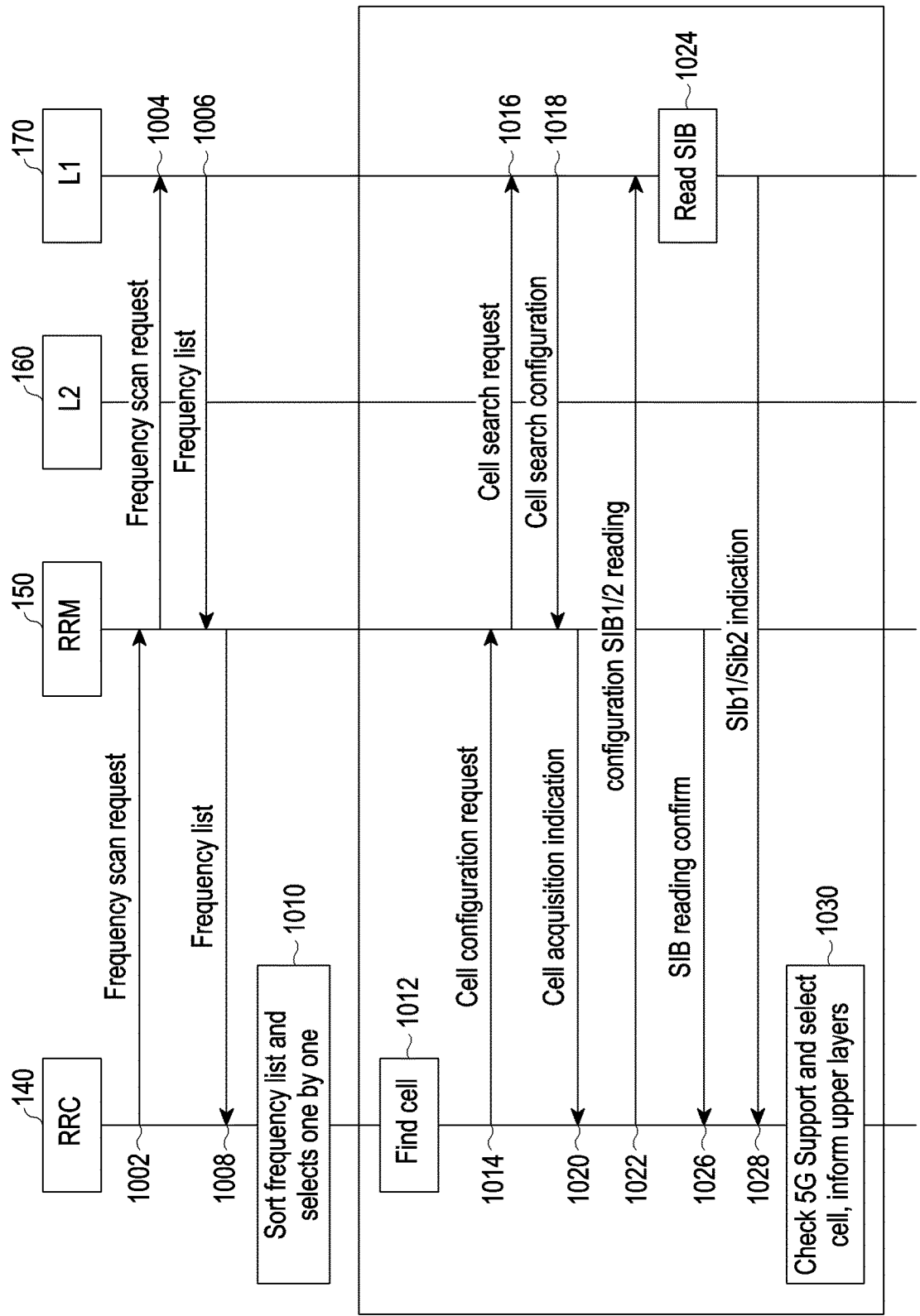
FIG. 10 illustrates a method for initial cell selection, according to an embodiment.

FIG. 10 illustrates a method for initial cell selection, according to an embodiment.

In step 1002, the RRC 140 sends the frequency scan request to the RRM 150. In step 1004, the RRM 150 sends the frequency scan request to the L1 layer 170. The L1 layer 170 sends the frequency list to the RRM 150 in step 1006. In step 1008, the RRM 150 sends the frequency list to the RRC 140. The RRC 140 sorts the frequency list and selects one by one in step 1010.

In step 1012, the RRC 140 finds the cell 210a and the RRC 140 sends the cell configuration request to the RRM 150 in step 1014. In step 1016, the RRM 150 sends the cell search request to the L1 layer 170. In step 1018, the L1 layer 170 sends the cell search configuration to the RRM 150. In step 1020, the RRM 150 sends the cell acquisition indication to the RRC 140. In step 1022, the RRC 140 sends the SIB1/SIB2 information to the L1 layer 170 through the RRM 150. The L1 layer 170 reads the SIB1 and SIB2 in step 1024. In step 1026, the RRM 150 sends the SIB reading confirm to the RRC 140. In step 1028, the L1 layer 170 sends the SIB1/SIB 2 indication to the RRC 140. In step 1030, the RRC 140 determines the 5G support, selects the cell 200a, and informs the upper layers.

Figure 11:
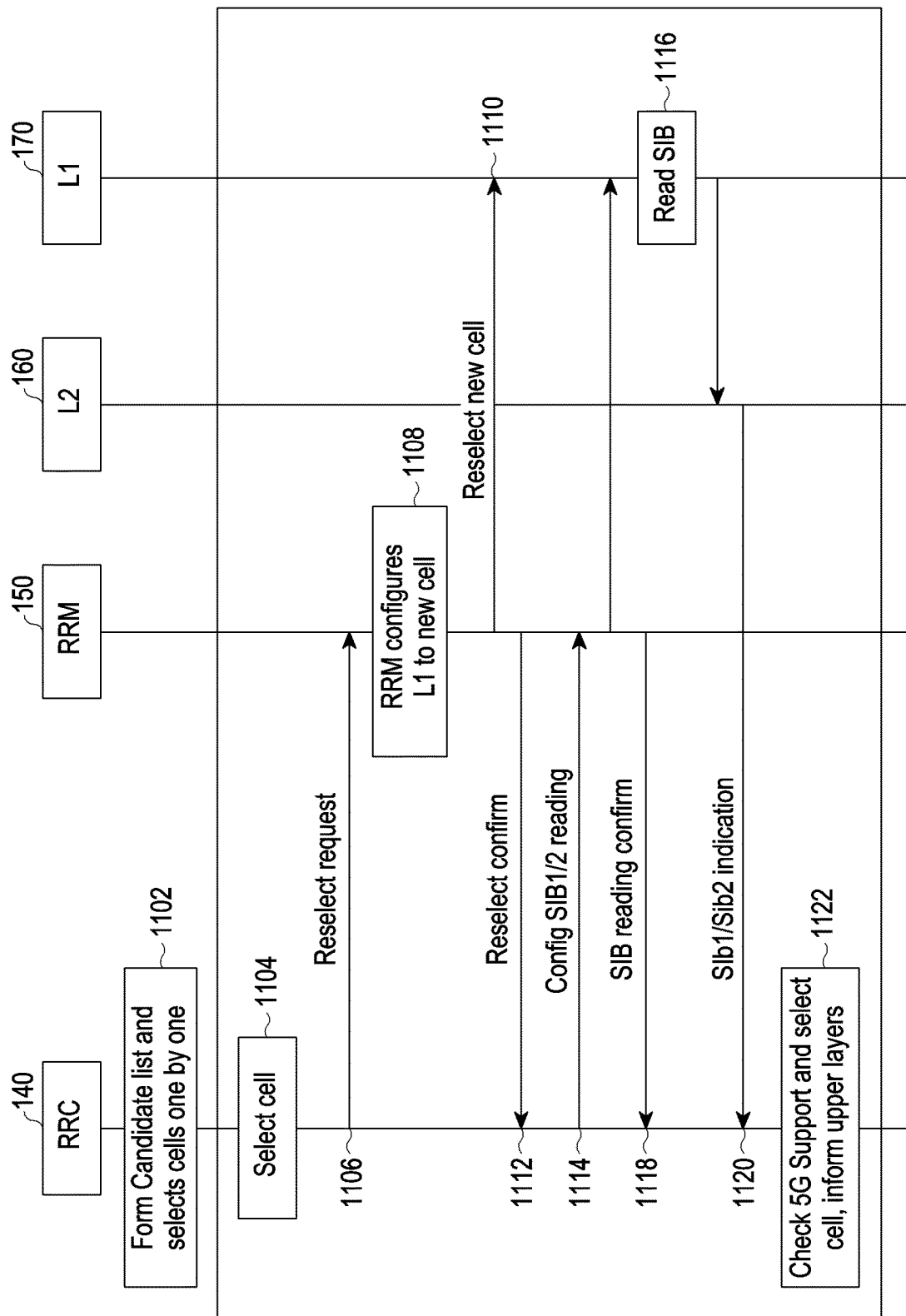
FIG. 11 illustrates a method for cell reselection, according to an embodiment.

FIG. 11 illustrates a method for cell reselection, according to an embodiment.

In step 1102, the RRC 140 selects cells one by one from the candidate list. In step 1104, the cell is selected. In step 1106, the RRC 140 sends the reselect request to the RRM 150. In step 1108, the RRM 150 configures L1 layer to new cell. In step 1110, the RRM 150 reselects the new cell. In step 1112, the RRM 150 sends the reselect confirm message to the RRC 150. In step 1114, the RRC 140 sends the configuration SIB1/SIB2 reading to the L1 layer 170 through the RRM 150. In step 1116, the L1 layer 170 reads the SIB1 and SIB 2 and the RRM 150 sends the SIB reading confirm message to the RRC 140 in step 1118. In step 1120, the L2 layer 160 indicates the SIB1/SIB 2 to the RRC 140. In step 1122, the RRC 140 checks the 5G Support, selects a cell and informs the upper layers.

The embodiments disclosed herein can be implemented using at least one software program running on at least one hardware device and performing network management functions to control the elements.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
scanning a plurality of frequencies;
obtaining cell information;
based on the obtained cell information, identifying a first cell to camp on from among a plurality of cells corresponding to the scanned plurality of frequencies, wherein, in identifying the first cell, a cell supporting an evolved-universal terrestrial radio access (E-UTRA) new radio (NR)-dual connectivity (DC) (EN-DC) is preferred by the UE over a cell not supporting the EN-DC; and
camping on the identified first cell.

2. The method of claim 1, wherein a cell selection preference for the cell supporting the EN-DC is configured for the UE.

3. The method of claim 1, further comprising:
storing cell information associated with the first cell.

4. The method of claim 1, further comprising:
storing first information corresponding to the first cell in response to identifying that the first cell supports the EN-DC; and
storing second information corresponding to a second cell in response to identifying that the second cell supports the EN-DC,
wherein the first information includes a type of the first cell and a frequency value of the first cell, and the second information includes a type of the second cell and a frequency value of the second cell.

5. The method of claim 1, further comprising:
receiving a system information block 1 (SIB1) message,
wherein identifying the first cell comprises identifying whether the first cell supports a 5th generation core (5GC) network connectivity based on an information element (IE) in the SIB1 message.

6. The method of claim 1, wherein the cell information is obtained from a system information block 2 (SIB2) message.

7. The method of claim 1, wherein the cell information comprises information identifying one or more cells supporting the EN-DC.

8. The method of claim 1, wherein the cell information is obtained from a memory of the UE.

9. The method of claim 1, wherein, in case that all of the plurality of cells are identified as not supporting the EN-DC, the UE camps on the cell not supporting the EN-DC.

10. The method of claim 1, further comprising:
obtaining frequency information stored for cell selection,
wherein the plurality of frequencies are scanned based on the frequency information.

11. A user equipment (UE) for handling cell selection in a wireless communication system, comprising:
a memory; and
at least one processor, coupled with the memory and configured to:
scan a plurality of frequencies,
obtain cell information,
based on the obtained cell information, identify a first cell to camp on from among a plurality of cells corresponding to the scanned plurality of frequencies, wherein, in identifying the first cell, a cell supporting an evolved-universal terrestrial radio access (E-UTRA) new radio (NR)-dual connectivity (DC) (EN-DC) is preferred by the UE over a cell not supporting the EN-DC, and
camp on the identified first cell.

12. The UE of claim 11, wherein a cell selection preference for the cell supporting the EN-DC is configured for the UE.

13. The UE of claim 11, wherein the at least one processor is further configured to control the memory to store cell information associated with the first cell.

14. The UE of claim 11, wherein the at least one processor is further configured to control the memory to:
store first information corresponding to the first cell in response to identifying that the first cell supports the EN-DC; and
store second information corresponding to a second cell in response to identifying that the second cell supports the EN-DC,
wherein the first information includes a type of the first cell and a frequency value of the first cell, and the second information includes a type of the second cell and a frequency value of the second cell.

15. The UE of claim 11, wherein the at least one processor is further configured to control the memory to:
receive a system information block 1 (SIB1) message, and
identify whether the first cell supports a 5th generation core (5GC) network connectivity based on an information element (IE) in the SIB1 message.

16. The UE of claim 11, wherein the cell information is obtained from a system information block 2 (SIB2) message.

17. The UE of claim 11, wherein the cell information comprises information identifying one or more cell supporting the EN-DC.

18. The UE of claim 11, wherein:
the memory is configured to store the cell information, and
the at least one processor is further configured to obtain the cell information from the memory.

19. The UE of claim 11, wherein, in case that all of the plurality of cells are identified as not supporting the EN-DC, the UE camps on the cell not supporting the EN-DC.

20. The UE of claim 11, wherein:
the at least one processor is further configured to obtain frequency information stored for cell selection, and
the plurality of frequencies are scanned based on the frequency information.

21. A non-transitory computer readable storage medium, wherein the non-transitory computer readable storage medium stores a computer program, which when executed by a processor, causes the processor to:
scan a plurality of frequencies;
obtain cell information;
based on the obtained cell information, identify a first cell to camp on from among a plurality of cells corresponding to the scanned plurality of frequencies, wherein, in identifying the first cell, a cell supporting an evolved-universal terrestrial radio access (E-UTRA) new radio (NR)-dual connectivity (DC) (EN-DC) is preferred by the UE over a cell not supporting the EN-DC; and
camp on the identified first cell.

* * * * *